US012695392B2

(12) United States Patent
Huang et al.

(10) Patent No.: US 12,695,392 B2
(45) Date of Patent: Jul. 28, 2026

(54) POWER CONVERTERS HAVING SYNCHRONOUS RECTIFIER CIRCUITS POWERED BY AUXILIARY WINDINGS

(71) Applicant: Navitas Semiconductor Limited, Dublin (IE)

(72) Inventors: Xiucheng Huang, Torrance, CA (US); Weijing Du, Torrance, CA (US); Yun Zhou, Shenzhen (CN)

(73) Assignee: NAVITAS SEMICONDUCTOR LIMITED, Dublin (IE)

( * ) Notice: Subject to any disclaimer, the term of this patent is extended or adjusted under 35 U.S.C. 154(b) by 104 days.

(21) Appl. No.: 18/531,619

(22) Filed: Dec. 6, 2023

(65) Prior Publication Data

US 2024/0195313 A1      Jun. 13, 2024

Related U.S. Application Data

(60) Provisional application No. 63/486,938, filed on Feb. 24, 2023.

(30) Foreign Application Priority Data

Dec. 12, 2022    (CN) .......................... 202211598349.0
Dec. 12, 2022    (CN) .......................... 202211600509.0

(51) Int. Cl.
*H02M 3/335*        (2006.01)
(52) U.S. Cl.
CPC ............................... *H02M 3/33592* (2013.01)

(58) Field of Classification Search
CPC ............ H02M 3/22; H02M 1/08; H02M 1/36; H02M 3/24; H02M 3/325; H02M 3/335;
(Continued)

(56) References Cited

U.S. PATENT DOCUMENTS 6,424,544 B1 *   7/2002   Svardsjo ........... H02M 3/33592
                                                                              363/127
7,236,041 B2     6/2007   Kim
(Continued)

OTHER PUBLICATIONS

Office Action (Final Rejection) dated Dec. 17, 2025 for U.S. Appl. No. 18/531,617 (pp. 1-13).
(Continued)

*Primary Examiner* — Jeffrey A Gblende
(74) *Attorney, Agent, or Firm* — FisherBroyles, LLP

(57) ABSTRACT

A circuit. The circuit includes a transformer having a primary winding extending between a first terminal and a second terminal, and a secondary winding extending between a third terminal and a first output terminal, and an auxiliary winding extending between a fourth terminal and the third terminal; a first switch having a first gate terminal, a first source terminal and a first drain terminal, the first drain terminal coupled to the second terminal and the first source terminal coupled to a power source; a second switch having a second gate terminal, a second source terminal and a second drain terminal, the second source terminal coupled to the third terminal and the second drain terminal coupled to a second output terminal, the secondary winding having a winding direction opposite to that of the primary winding and the auxiliary winding having a winding direction same as that of the primary winding.

17 Claims, 4 Drawing Sheets

(58) Field of Classification Search
CPC ...... H02M 3/28; H02M 3/01; H02M 3/33569; H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553; H02M 3/33523; H02M 3/33561; H02M 3/155; H02M 3/1582; H02M 1/4233; H02M 1/12; H02M 3/07; H02M 7/219; H02M 7/4815; H02M 1/0048; H02M 7/4818; H02M 7/4826; H02M 7/4833; Y02B 70/1491
See application file for complete search history.

(56) References Cited

U.S. PATENT DOCUMENTS

| | | | | | |
|---|---|---|---|---|---|
| 7,764,521 | B2 * | 7/2010 | Lin | ................... | H02M 3/33523 |
| | | | | | 363/21.16 |
| 7,791,910 | B2 | 9/2010 | Pwu | | |
| 9,576,720 | B2 * | 2/2017 | de Groot | ............... | H01F 27/385 |
| 9,748,854 | B2 * | 8/2017 | Li | ....................... | H02M 1/4258 |
| 10,056,844 | B2 | 8/2018 | Quaglino | | |
| 10,554,140 | B1 | 2/2020 | Khamesra | | |
| 10,651,746 | B2 * | 5/2020 | Song | ................. | H02M 3/33592 |
| 11,626,808 | B1 | 4/2023 | Vinciarelli | | |
| 11,641,165 | B2 * | 5/2023 | Zhang | ............... | H02M 3/33507 |
| | | | | | 363/21.14 |
| 2003/0193820 | A1 * | 10/2003 | Nakayama | ........ | H02M 3/33592 |
| | | | | | 363/21.14 |
| 2006/0018133 | A1 | 1/2006 | Hua | | |
| 2024/0195312 | A1 | 6/2024 | Huang | | |

OTHER PUBLICATIONS

Office Action (Non-Final Rejection) dated Mar. 10, 2026 for U.S. Appl. No. 18/531,617 (pp. 1-13).
Office Action (Non-Final Rejection) dated Aug. 27, 2025 for U.S. Appl. No. 18/531,617 (pp. 1-12).

* cited by examiner

POWER CONVERTERS HAVING SYNCHRONOUS RECTIFIER CIRCUITS POWERED BY AUXILIARY WINDINGS

CROSS-REFERENCE TO RELATED APPLICATIONS

This application claims priority to U.S. provisional patent application Ser. No. 63/486,938, for "SYNCHRONOUS RECTIFIER CIRCUIT POWERED BY AUXILIARY WINDING," filed on Feb. 24, 2023, which claims priority to commonly assigned Chinese provisional patent application Serial Nos. 202211600509.0, filed on Dec. 12, 2022, entitled "SYNCHRONOUS RECTIFIER CIRCUIT POWERED BY AUXILIARY WINDINGS", and 202211598349.0, for "SYNCHRONOUS RECTIFIER CIRCUIT POWERED BY POWER WINDINGS," filed on Dec. 12, 2022. This application is also related to the following concurrently filed and commonly assigned U.S. patent application Ser. No. 18/531,617 entitled "SYNCHRONOUS RECTIFIER CIRCUIT POWERED BY A PORTION OF SECONDARY WINDINGS," filed Dec. 6, 2023, the contents of all of which are hereby incorporated by reference in their entirety for all purposes.

FIELD

The described embodiments relate generally to power converters, and more particularly, the present embodiments relate to power converters having synchronous rectifier circuits powered by auxiliary windings.

BACKGROUND

Electronic devices such as computers, servers and televisions, among others, employ one or more electrical power conversion circuits to convert one form of electrical energy to another. Some electrical power conversion circuits use switching power supplies such as a flyback converter. Switching power supplies can efficiently convert power from a source to a load. Switching power supplies may have relatively high power conversion efficiency, as compared to other types of power converters. Switching power supplies may also be substantially smaller and lighter than a linear supply due to the smaller transformer size and weight.

SUMMARY

In some embodiments, a circuit is disclosed. The circuit includes a transformer including a primary winding extending between a first terminal and a second terminal, and further including a secondary winding extending between a third terminal and a first output terminal, and further including an auxiliary winding extending between a fourth terminal and the third terminal; a first switch having a first gate terminal, a first source terminal and a first drain terminal, the first drain terminal coupled to the second terminal and the first source terminal coupled to a power source; and a second switch having a second gate terminal, a second source terminal and a second drain terminal, the second source terminal coupled to the third terminal and the second drain terminal coupled to a second output terminal; where the secondary winding has a winding direction that is opposite to that of the primary winding and where the auxiliary winding has a winding direction that is same as that of the primary winding.

In some embodiments, the circuit further includes a diode having an anode and a cathode, wherein the cathode is coupled to the fourth terminal. In some embodiments, the circuit further includes a controller circuit that is coupled to the anode, to the third terminal, to the second gate terminal and to the second drain terminal. In some embodiments, the controller circuit is arranged to control a voltage at the second gate terminal such that when the first switch is on, the second switch is off and when the first switch is off, the second switch is on. In some embodiments, the circuit further includes a load coupled between the first output terminal and the second output terminal. In some embodiments, the circuit further includes a capacitor coupled in between the first output terminal and the second output terminal. In some embodiments, the first switch is a gallium nitride (GaN) based transistor.

In some embodiments, a circuit is disclosed. The circuit includes a transformer including a primary winding extending between a first terminal and a second terminal, and further including a secondary winding extending between a third terminal and a first output terminal, and further including an auxiliary winding extending between a fourth terminal and the third terminal; a first switch having a first gate terminal, a first source terminal and a first drain terminal, the first drain terminal coupled to the second terminal and the first source terminal coupled to a power source; a second switch having a second gate terminal, a second source terminal and a second drain terminal, the second source terminal coupled to the third terminal and the second drain terminal coupled to a second output terminal; and a third switch having a third gate terminal, a third source terminal and a third drain terminal, the third drain terminal coupled to the second terminal and the second source terminal coupled to a first node of a first capacitor, a second node of the first capacitor coupled to the first terminal; where the secondary winding has a winding direction that is opposite to that of the primary winding and where the auxiliary winding has a winding direction that is same as that of the primary winding.

In some embodiments, a circuit is disclosed. The circuit includes a transformer including a primary winding extending between a first terminal and a second terminal, and further including a secondary winding extending between a third terminal and a first output terminal, and further including an auxiliary winding extending between a fourth terminal and the third terminal; a first switch having a first gate terminal, a first source terminal and a first drain terminal, the first drain terminal coupled to first node of a capacitor and the first source terminal coupled to a power source, a second node of the capacitor coupled to the second terminal; a second switch having a second gate terminal, a second source terminal and a second drain terminal, the second source terminal coupled to the third terminal and the second drain terminal coupled to a second output terminal; a first winding coupled between the first terminal and the power source; and a third switch having a third gate terminal, a third source terminal and a third drain terminal, the third drain terminal coupled to the first winding and the second source terminal coupled to the first drain terminal; where the secondary winding has a winding direction that is opposite to that of the primary winding and where the auxiliary winding has a winding direction that is same as that of the primary winding.

DETAILED DESCRIPTION

Circuits, devices and related techniques disclosed herein relate generally to power converters. More specifically, circuits, devices and related techniques disclosed herein relate to power converter circuit having synchronous rectification circuits that are powered by auxiliary windings, where the auxiliary windings can provide power to the synchronous rectification controller. In some embodiments, power for the synchronous rectification controller can be generated through a forward mode, which can effectively reduce the fluctuation of the power supply voltage and reduce the number of turns of the auxiliary winding. In various embodiments, a power converter circuit includes a primary winding, a secondary winding, an auxiliary winding, a synchronous rectifier switch and a synchronous rectifier switch controller.

In some embodiments, the secondary winding has a winding direction that is opposite to that of the primary winding and the auxiliary winding has a winding direction that is same as that of the primary winding. In various embodiments, the power converter circuit further includes a main switch on the primary side. In some embodiments, the main switch and/or the synchronous rectifier switch may be gallium nitride (GaN) based transistor, silicon carbide (SiC) based transistors or silicon based transistors. Various inventive embodiments are described herein, including methods, processes, systems, devices, and the like.

Several illustrative embodiments will now be described with respect to the accompanying drawings, which form a part hereof. The ensuing description provides embodiment (s) only and is not intended to limit the scope, applicability, or configuration of the disclosure. Rather, the ensuing description of the embodiment(s) will provide those skilled in the art with an enabling description for implementing one or more embodiments. It is understood that various changes may be made in the function and arrangement of elements without departing from the spirit and scope of this disclosure. In the following description, for the purposes of explanation, specific details are set forth in order to provide a thorough understanding of certain inventive embodiments. However, it will be apparent that various embodiments may be practiced without these specific details. The figures and description are not intended to be restrictive. The word "example" or "exemplary" is used herein to mean "serving as an example, instance, or illustration." Any embodiment or design described herein as "exemplary" or "example" is not necessarily to be construed as preferred or advantageous over other embodiments or designs.

Figure 1:
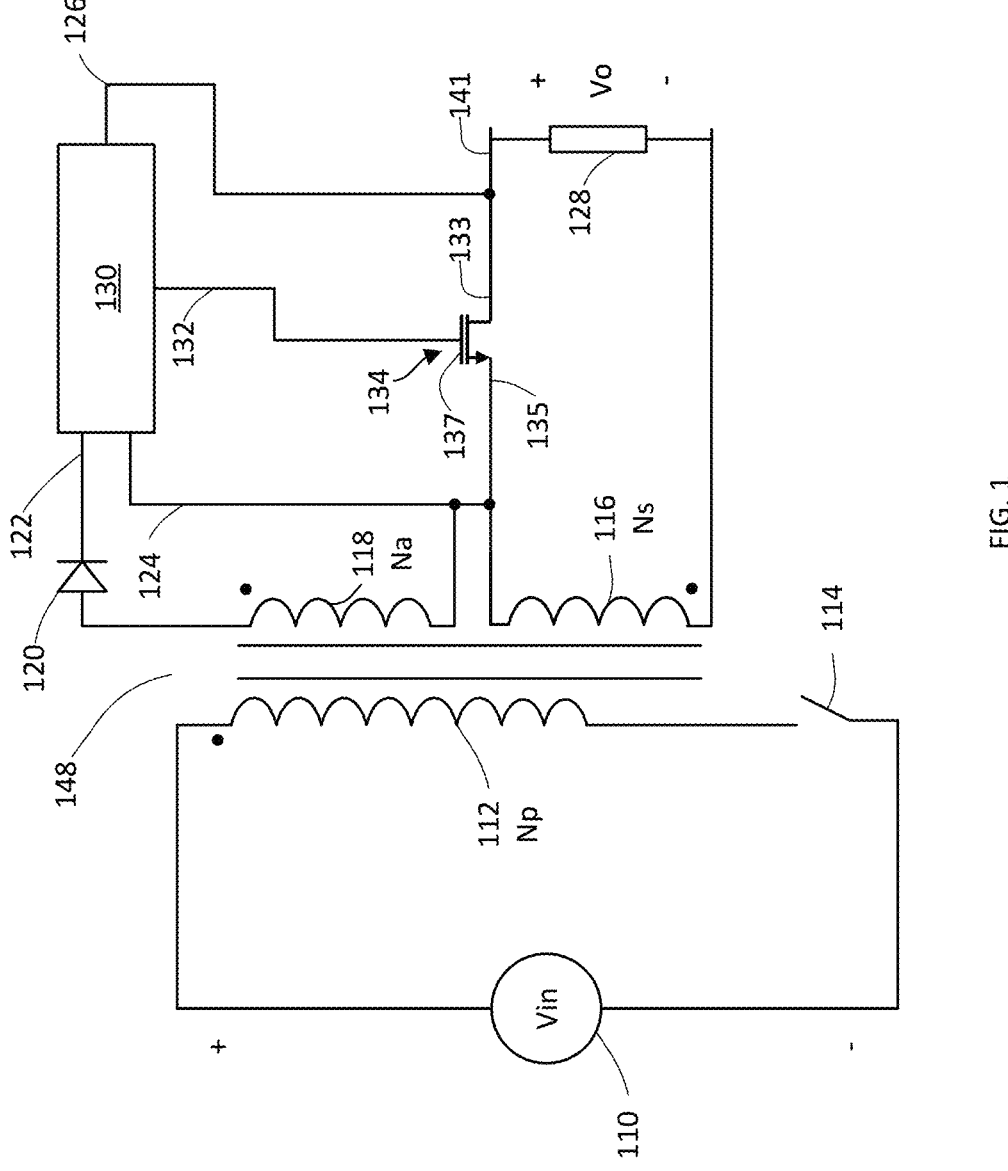
FIG. 1 shows a schematic of a power converter having a synchronous rectifier circuit powered by auxiliary windings, according to some embodiments.

FIG. 1 shows a schematic of a power converter 100 having a synchronous rectification circuit powered by auxiliary windings, according to some embodiments. The power converter 100 can include a transformer 148 having a primary winding 112, a secondary winding 116 and an auxiliary winding 118. The auxiliary winding 118 may be positively coupled with the primary winding 112 and may be anti-coupled with the secondary winding 116. The primary winding 112 may be anti-coupled with the secondary winding 116. The primary winding 112 can be coupled to an input power supply 110 and can also be coupled to a main switch 114. The main switch may be coupled to the input power supply 110. A first terminal of the auxiliary winding 118 can be coupled to an anode of a diode 120. A cathode of the diode 120 may be coupled to a synchronous rectifier controller (SRC) 130 at a node 122. A second terminal of the auxiliary winding 118 may be coupled to a synchronous rectifier (SR) switch 134.

In some embodiments, the SR switch 134 may be a transistor having source terminal 135, a gate terminal 137 and a drain terminal 133. In various embodiments, the SR switch 134 may be gallium nitride (GaN) based, or silicon (Si) based, or silicon carbide (SiC) based transistor. The second terminal of the auxiliary winding 118 may also be coupled to the SRC 130 at a node 124. The gate terminal 137 can be coupled to the SRC 130 at a node 132. The SRC 130 can be arranged to provide a gate drive signal to the SR switch 134 at node 132, where the SRC 130 can control a voltage at the gate terminal 137. The drain terminal 133 may be coupled to the SRC 130 at a node 126. The drain terminal 133 may also be connected to an output terminal 141. The output terminal 141 may be coupled to a load 128. A first terminal of the secondary winding 116 can be coupled to the source terminal a 135 and a second terminal of the secondary winding 116 may be coupled to the load 128. The secondary winding 116 may be anti-coupled to the auxiliary winding 118.

The power converter 100 having a synchronous rectifier circuit powered by auxiliary windings can operate as a flyback converter. When the main switch 114 is closed, the output of the auxiliary winding 118 may be positive and the diode 120 may be forward biased, producing a positive voltage Vcc at node 122. During the time period in which the main switch 114 is closed, the magnetics of primary winding 112 may be charged. The SR switch 134 may remain open during this time period. When the main switch 114 opens, the output of auxiliary winding 118 may become negative, reverse biasing the diode 120. The voltage at the secondary winding 116 may become positive and the SR switch 134 may turn on. The secondary winding 116 can also be coupled to the output terminal 141.

Figure 2:
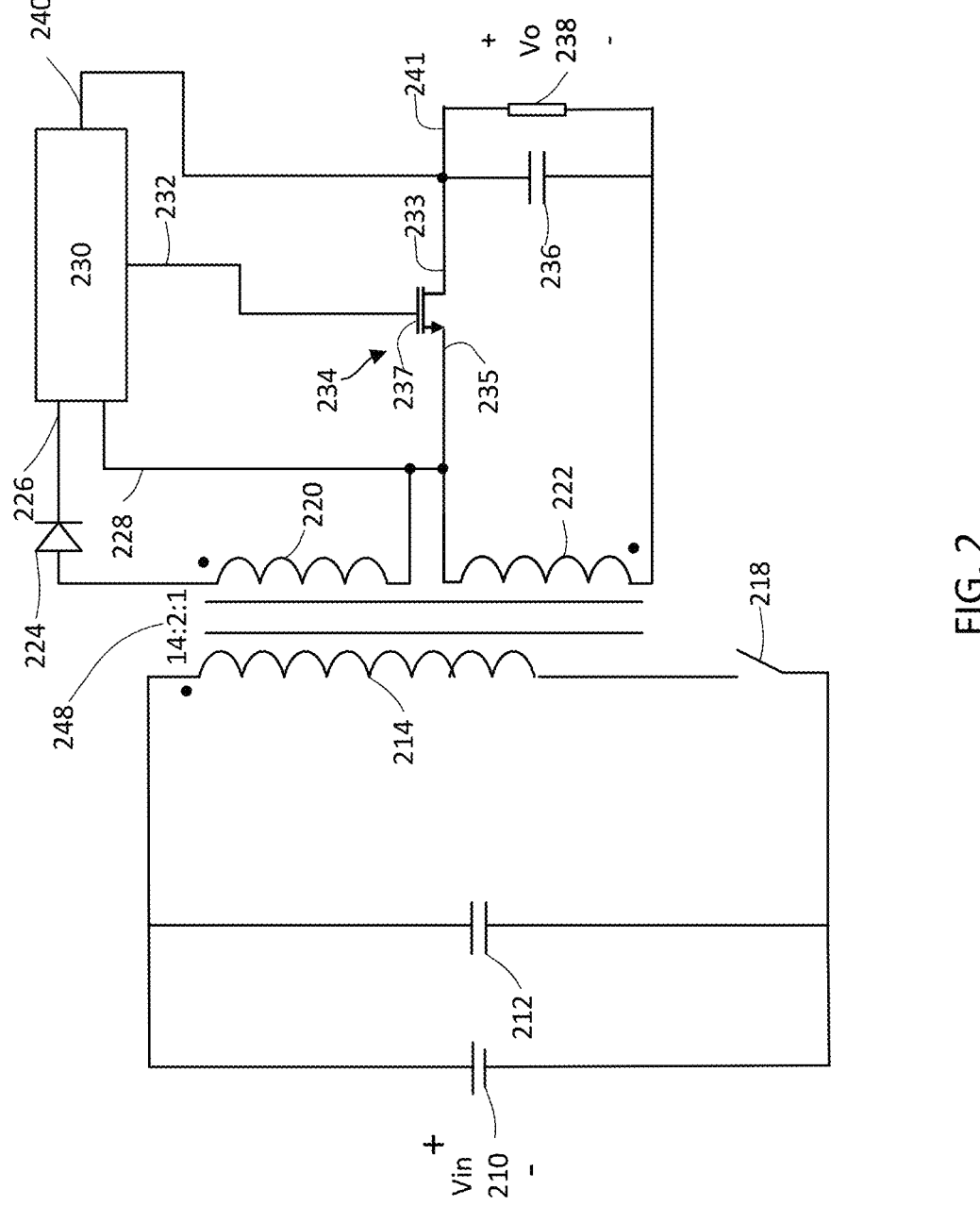
FIG. 2 shows a schematic of a synchronous rectified flyback converter with an auxiliary winding used as a forward converter to power a synchronous rectifier controller, according to some embodiments.

FIG. 2 shows a schematic of a synchronous rectified flyback converter 200 with an auxiliary winding used as a forward converter to power a synchronous rectifier controller (SRC), according to some embodiments. The power converter 200 can include a transformer 248 having a primary winding 214, a secondary winding 222 and an auxiliary winding 220. The auxiliary winding 220 may be positively coupled with the primary winding 214 and may be anti-coupled with the secondary winding 222. The primary winding 214 may be anti-coupled with the secondary winding 222. The primary winding 214 can be coupled to an input power supply 210 (Vin) and can also be coupled to a main switch 218. The primary winding 214 can further be coupled to an input capacitor 212, where the input capacitor 212 may be coupled in parallel to the input power supply 210. The main switch 218 may be coupled to the input power supply 210. A first terminal of the auxiliary winding 220 can be coupled to an anode of a diode 224. A cathode of the diode 224 may be coupled to a synchronous rectifier controller (SRC) 230 at a node 226. A second terminal of the auxiliary winding 220 may be coupled to a synchronous rectifier (SR) switch 234.

In some embodiments, the SR switch 234 may be a transistor having source terminal 235, a gate terminal 237 and a drain terminal 233. In various embodiments, the SR switch 234 may be gallium nitride (GaN) based, or silicon (Si) based, or silicon carbide (SiC) based transistor. The second terminal of the auxiliary winding 220 may also be coupled to the SRC 230 at a node 228. The gate terminal 237 can be coupled to the SRC 230 at a node 232. The SRC 230 can be arranged to provide a gate drive signal to the SR switch 234 at node 232, where the SRC 230 can control a voltage at the gate terminal 237. The drain terminal 233 may be coupled to the SRC 230 at a node 240. The drain terminal 233 may also be connected to an output terminal 241. The output terminal 241 may be coupled to a load 238. A first terminal of the secondary winding 222 can be coupled to the source terminal a 235 and a second terminal of the secondary winding 222 may be coupled to the load 238. The secondary winding 222 may be anti-coupled to the auxiliary winding 220. A capacitor 236 can be coupled in parallel with the load 238.

The power converter 200 can operate as a combination forward converter and flyback converter. During a first time period, when main switch 218 is closed, the magnetizing and leakage inductance of primary winding 214 can charge. A voltage of auxiliary winding 220 may be positive thereby forward biasing the diode 224 and driving the node 226 that is the Vcc (power supply for the SRC 230). The SR switch 234 may be open during the first time period. During a second time period, when the main switch 218 is opened, the voltage of the auxiliary winding 220 may become negative thereby reverse biasing the diode 224. The SR switch 234 may turn on, thereby connecting the secondary winding 222 to the output terminal 241.

In an example of the power converter 200, the primary winding 214 may have 14 turns, the secondary winding 222 may have 2 windings and the auxiliary winding 220 may have one winding. An output voltage of the secondary winding 222 is $\frac{2}{14}$*Vin. A voltage at the auxiliary winding 220 is $\frac{1}{14}$*Vin. The gain of the secondary winding can be higher than the ratio of windings due to the magnetic discharge of the primary winding. The primary winding 214 can have a number of windings Np, the secondary winding 222 can have a number of windings Ns and the auxiliary winding 220 can have a number of windings Na. The output of the auxiliary winding can be a ratio of the windings from Na over Np. The disclosed embodiment is advantageous because the gain can be minimized by a one winding auxiliary used as a forward converter. Because of the lower gain, variation of input voltage may result in a lower voltage deviation at the node 226 that supplies power Vcc to the SRC 230.

The power converter 200 showing in FIG. 2 can use a flyback converter. In an example, a variation range of the input voltage $V_{in}$ can be 127 V to 373 V, and a variation range of the output voltage $V_o$ at the output terminal 241 can be 3.3 V to 20 V. The number of turns of the primary winding Np=14, and the number of turns of the secondary winding Ns=2. In the illustrated example, only one turn of the auxiliary winding Na can be used (Na=1), therefore sufficient power can be supplied to the SRC 230. When the main switch 218 is closed, the SR switch 234 is open. Since the auxiliary winding 220 is positively coupled with the primary winding 214, the diode 224 can be forward biased and the auxiliary winding 220 can supply power to node 226 (Vcc) that provide power to SRC 230. When the main switch 218 is opened, the SR switch 234 is turned on, and the diode 224 may be reverse biased. The auxiliary winding 220 can supply power to the SRC 230 using the forward converter. According to Formula: Vcc=Na/Np*Vin, the variation range of the supply voltage Vcc is 9 V to 26 V. As can be seen, the maximum supply voltage is only 2.9 times the minimum supply voltage, and the fluctuation of the supply voltage Vcc is greatly reduced. Moreover, the number of turns of the auxiliary winding 220 is reduced to 1 turn, and the minimum supply voltage is increased to 9V, thereby improving the operational performance of the power converter 200.

Figure 3:
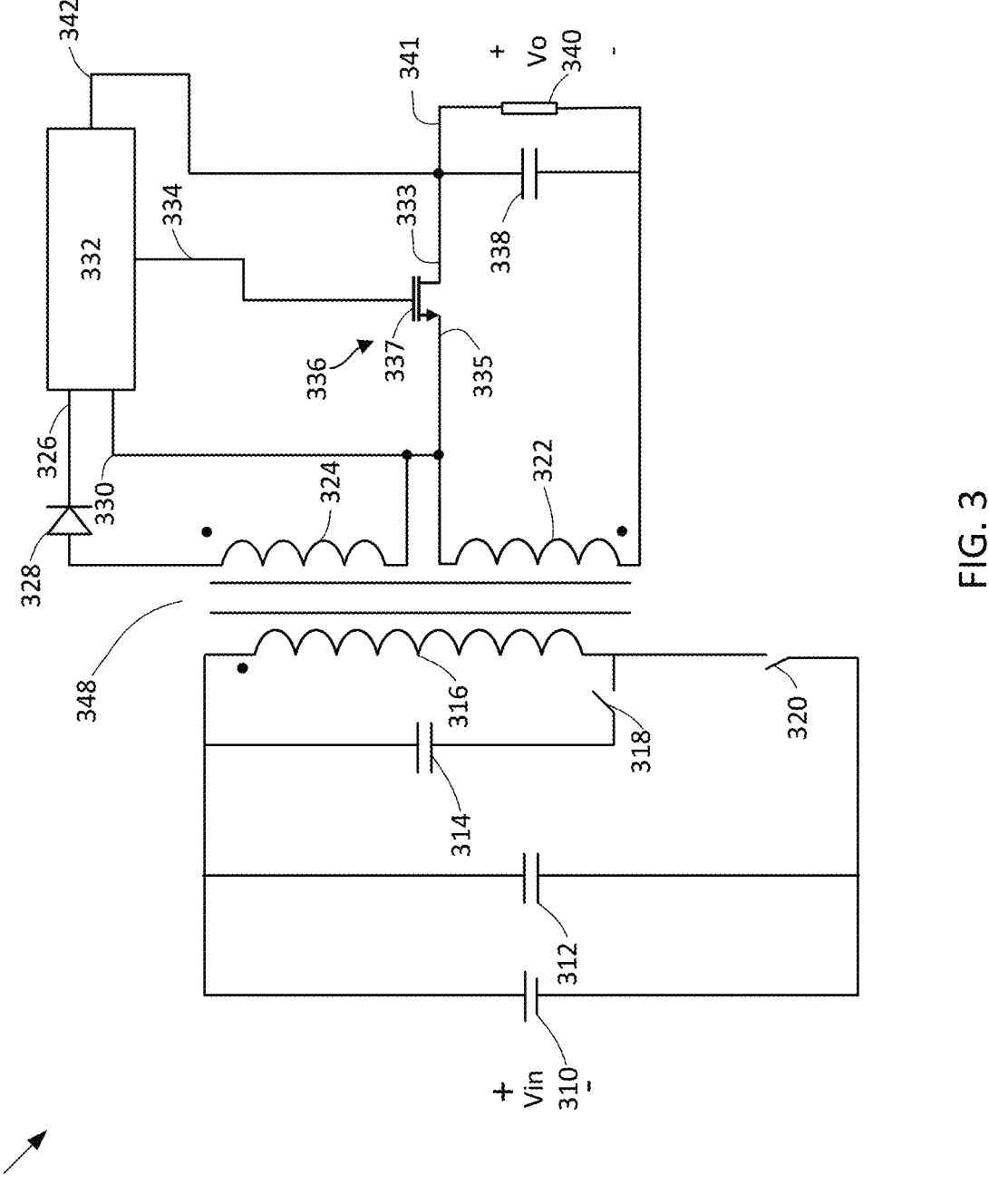
FIG. 3 shows a schematic of a flyback converter having a synchronous converter with an active clamp, according to some embodiments.

FIG. 3 shows a schematic of a flyback converter 300 having a synchronous converter with an active clamp, according to some embodiments. The flyback converter 300 can include a transformer 348 having a primary winding 316, a secondary winding 322 and an auxiliary winding 324. The auxiliary winding 324 may be positively coupled with the primary winding 316 and may be anti-coupled with the secondary winding 322. The primary winding 316 may be anti-coupled with the secondary winding 322. The primary winding 316 can be coupled to an input power supply 310 (Vin) and can also be coupled to a main switch 320. A clamp capacitor 314 may be coupled in series with a switch 318, where the clamp capacitor 314 and the switch 318 can be coupled in parallel to the primary winding 316. The primary winding 316 can further be coupled to an input capacitor 312, where the input capacitor 312 may be coupled in parallel to the input power supply 210. The main switch 320 may be coupled to the input power supply 310. A first terminal of the auxiliary winding 324 can be coupled to an anode of a diode 328. A cathode of the diode 328 may be coupled to a synchronous rectifier controller (SRC) 332 at a node 326. A second terminal of the auxiliary winding 324 may be coupled to a synchronous rectifier (SR) switch 336.

In some embodiments, the SR switch 336 may be a transistor having source terminal 335, a gate terminal 337 and a drain terminal 333. In various embodiments, the switch SR 336 may be gallium nitride (GaN) based, or silicon (Si) based, or silicon carbide (SiC) based transistor. The second terminal of the auxiliary winding 324 may also be coupled to the SRC 332 at a node 330. The gate terminal 337 can be coupled to the SRC 332 at a node 334. The SRC 332 can be arranged to provide a gate drive signal to the SR switch 336 at node 334, where the SRC 230 can control a voltage at the gate terminal 337. The drain terminal 333 may be coupled to the SRC 230 at a node 342. The drain terminal 333 may also be connected to an output terminal 341. The output terminal 341 may be coupled to a load 340. A first terminal of the secondary winding 322 can be coupled to the source terminal a 335 and a second terminal of the secondary winding 322 may be coupled to the load 340. The secondary winding 322 may be anti-coupled to the auxiliary winding 220. A capacitor 338 may be coupled in parrel with the load 340.

The circuit of FIG. 3 can operate as a flyback converter with a synchronous rectifier on the output. During a first time period, the cycle begins with the closing of the main switch 320 that can cause current to flow through the primary winding 316 and charge the magnetization and leakage inductances. The current flow through the primary winding 316 can generate a positive output in the auxiliary winding 324 causing the diode 328 to forward bias, thereby powering node 326 that is the Vcc input for the SRC 332. During the first time period, the SR switch 336 may be open. During a second time period, when the main switch 320 is opened, a voltage stress may appear on the main switch 320. To mitigate this voltage stress, the switch 318 can be closed to absorb the leakage energy as it dissipates from the primary winding 316. The energy stored in the primary winding 316 magnetization inductance may be transferred to the output of the secondary winding 322. The SR switch 336 can be turned-on and the voltage of the secondary winding 322 may be applied to output terminal 341 across the load 340.

Figure 4:
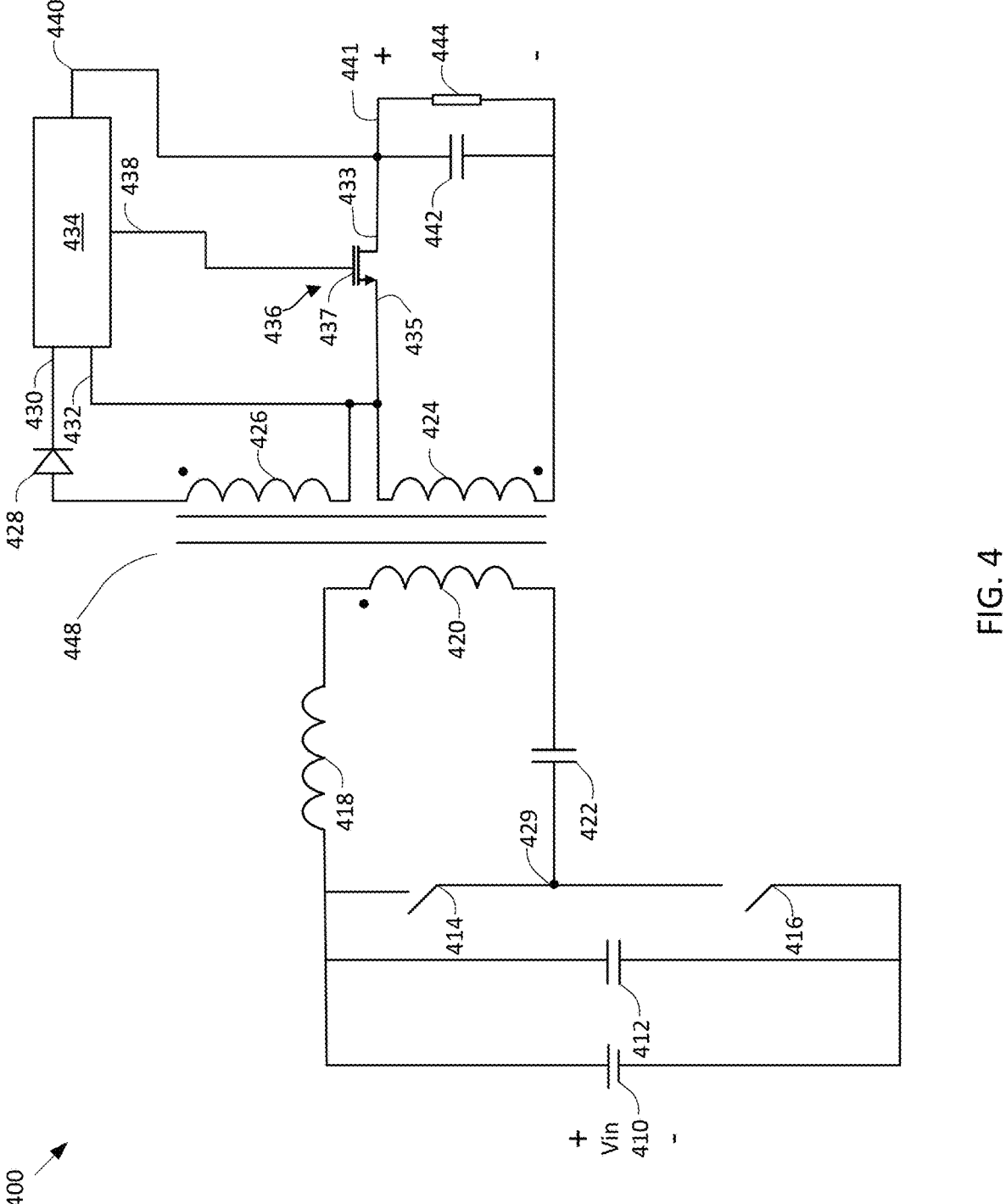
FIG. 4 shows a schematic of an asymmetric half bridge converter with synchronous rectifier circuit powered by auxiliary windings, according to some embodiments.

FIG. 4 shows a schematic of an asymmetric half bridge converter 400 with synchronous rectifier circuit powered by auxiliary windings, according to some embodiments. The converter 400 can include a transformer 448 having a primary winding 420, a secondary winding 424 and an auxiliary winding 426. The auxiliary winding 426 may be positively coupled with the primary winding 420 and may be anti-coupled with the secondary winding 424. The primary winding 420 may be anti-coupled with the secondary winding 424. The primary winding 420 can be coupled to an input power supply 410 (Vin) and can also be coupled to a capacitor 422. The capacitor 422 may be coupled to a switch node 429. The primary winding 420 may also be coupled in series to an inductor 418. The inductor 418 may be coupled to a high-side switch 414 and also to the input power supply 410. The high-side switch 414 can be coupled to a low-side switch 416 at the switch node 429. An input capacitor 412 may be coupled in parallel to the input power supply 210. The high-side switch 414 may be coupled to the input power supply 410 and the low-side switch 416 may be coupled to the input power supply 410. A first terminal of the auxiliary winding 426 can be coupled to an anode of a diode 428. A cathode of the diode 428 may be coupled to a synchronous rectifier controller (SRC) 434 at a node 430. A second terminal of the auxiliary winding 426 may be coupled to a synchronous rectifier (SR) switch 436.

In some embodiments, the SR switch 436 may be a transistor having source terminal 435, a gate terminal 437 and a drain terminal 433. In various embodiments, the SR switch 436 may be gallium nitride (GaN) based, or silicon (Si) based, or silicon carbide (SiC) based transistor. The second terminal of the auxiliary winding 426 may also be coupled to the SRC 434 at a node 432. The gate terminal 437 can be coupled to the SRC 434 at a node 438. The SRC 434 can be arranged to provide a gate drive signal to the SR switch 436 at node 438, where the SRC 434 can control a voltage at the gate terminal 437. The drain terminal 433 may be coupled to the SRC 434 at a node 440. The drain terminal 433 may also be connected to an output terminal 441. The output terminal 441 may be coupled to a load 444. A first terminal of the secondary winding 424 can be coupled to the source terminal a 435 and a second terminal of the secondary winding 424 may be coupled to the load 444. The secondary winding 424 may be anti-coupled to the auxiliary winding 426. A capacitor 442 may be coupled in parrel with the load 444.

In some embodiments, the circuit of FIG. 4 can operate as an asymmetric half bridge. During a first time period, the input power supply 410 can drive the resonant circuit formed by inductor 418, the primary winding 420 and capacitor 422 when low-side switch 416 is closed and high-side switch 414 is open. The current through the primary winding 420 can generate a positive voltage on the auxiliary winding 426. The diode 428 can be forward biased and supply the voltage Vcc at node 430 to the SRC 434. During the first time period, the SR switch 436 is open. During a second time period, the low-side switch 416 opens and high-side switch 414 closes, thereby the stored energy in the primary winding 420 can transfer into the secondary winding 424. The current circulates through the resonant circuit formed by 418, 420 and 422 so that the voltage of the auxiliary winding 426 becomes negative, reverse biasing the diode 428. During the second time period, the SR switch 436 may turn on such that the voltage across the secondary winding 424 drives the voltage at the output terminal 441 (across the load 444). The resonant circuit made up of 418, 420 and 422 may be arranged to operate in three primary modes, in less than resonant, at resonant, or above resonant modes. These modes can be used for zero voltage switching and ease the voltage stress on high-side switch 414 and low-side switch 416.

In some embodiments, combination of the circuits and methods disclosed herein can be utilized for power converter circuits having synchronous rectifier circuits powered by auxiliary windings. Although circuits and methods are described and illustrated herein with respect to several particular configuration of power converters, embodiments of the disclosure are suitable for other power converter topologies, such as, but not limited to, PFC converters and LLC converters.

In the foregoing specification, embodiments of the disclosure have been described with reference to numerous specific details that can vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction. The specific details of particular embodiments can be combined in any suitable manner without departing from the spirit and scope of embodiments of the disclosure.

Additionally, spatially relative terms, such as "bottom or "top" and the like can be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as a "bottom" surface can then be oriented "above" other elements or features. The device can be otherwise oriented (e.g., rotated 90 degrees or at other orientations) and the spatially relative descriptors used herein interpreted accordingly.

Terms "and," "or," and "an/or," as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, B, C, AB, AC, BC, AA, AAB, ABC, AABBCCC, etc.

Reference throughout this specification to "one example," "an example," "certain examples," or "exemplary implementation" means that a particular feature, structure, or characteristic described in connection with the feature and/ or example may be included in at least one feature and/or example of claimed subject matter. Thus, the appearances of the phrase "in one example," "an example," "in certain examples," "in certain implementations," or other like phrases in various places throughout this specification are not necessarily all referring to the same feature, example, and/or limitation. Furthermore, the particular features, structures, or characteristics may be combined in one or more examples and/or features.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter. Therefore, it is intended that claimed subject matter not be limited to the particular examples disclosed, but that such claimed subject matter may also include all aspects falling within the scope of appended claims, and equivalents thereof.

What is claimed is:

1. A circuit comprising:
a transformer including a primary winding extending between a first terminal and a second terminal, and further including a secondary winding extending between a third terminal and a first output terminal, and further including an auxiliary winding extending between a fourth terminal and the third terminal;
a first switch having a gate terminal, a source terminal and a drain terminal, the source terminal coupled to the third terminal and the drain terminal coupled to a second output terminal;
a second switch coupled between the second terminal and a power source; and
a diode having an anode and a cathode, the anode coupled to the fourth terminal and the cathode coupled to a controller circuit, wherein the controller circuit is directly coupled to the third terminal, and wherein the controller circuit is directly coupled to the second output terminal; and
wherein the secondary winding has a winding direction that is opposite to that of the primary winding and wherein the auxiliary winding has a winding direction that is same as that of the primary winding.

2. The circuit of claim 1, wherein the controller circuit is further coupled to the gate terminal and the drain terminal.

3. The circuit of claim 2, wherein the controller circuit is arranged to control a voltage at the gate terminal such that when the first switch is on, the second switch is off and when the first switch is off, the second switch is on.

4. The circuit of claim 3, further comprising a load coupled between the first output terminal and the second output terminal.

5. The circuit of claim 4, further comprising a capacitor coupled in between the first output terminal and the second output terminal.

6. The circuit of claim 1, wherein the first switch is a gallium nitride (GaN) based transistor.

7. A circuit comprising:
a transformer including a primary winding extending between a first terminal and a second terminal, and further including a secondary winding extending between a third terminal and a first output terminal, and further including an auxiliary winding extending between a fourth terminal and the third terminal;
a first switch having a gate terminal, a source terminal and a drain terminal, the source terminal coupled to the third terminal and the drain terminal coupled to a second output terminal; and
a second switch coupled between the second terminal and a power source;
a capacitor coupled between the first terminal and the second terminal;
a third switch coupled between the capacitor and the second terminal;
a diode having an anode and a cathode, the anode coupled to the fourth terminal and the cathode coupled to a controller circuit, wherein the controller circuit is directly coupled to the third terminal, and wherein the controller circuit is directly coupled to the second output terminal; and
wherein the secondary winding has a winding direction that is opposite to that of the primary winding and wherein the auxiliary winding has a winding direction that is same as that of the primary winding.

8. The circuit of claim 7, wherein the controller circuit is further coupled to the gate terminal and the drain terminal.

9. The circuit of claim 8, wherein the controller circuit is arranged to control a voltage at the gate terminal such that when the first switch is on, the second switch is off and when the first switch is off, the second switch is on.

10. The circuit of claim 7, further comprising a load coupled between the first output terminal and the second output terminal.

11. The circuit of claim 10, wherein the capacitor is a first capacitor and wherein the circuit further comprises a second capacitor coupled between the first output terminal and the second output terminal.

12. The circuit of claim 7, wherein the first switch is a gallium nitride (GaN) based transistor.

13. A circuit comprising:
a transformer including a primary winding extending between a first terminal and a second terminal, and further including a secondary winding extending between a third terminal and a first output terminal, and further including an auxiliary winding extending between a fourth terminal and the third terminal;
a first switch having a gate terminal, a source terminal and a drain terminal, the source terminal coupled to the third terminal and the drain terminal coupled to a second output terminal;
a second switch coupled between the second terminal and a power source;
a third switch coupled between the second terminal and the power source;
a diode having an anode and a cathode, the anode coupled to the fourth terminal and the cathode coupled to a controller circuit, wherein the controller circuit is directly coupled to the third terminal, and wherein the controller circuit is directly coupled to the second output terminal; and
wherein the secondary winding has a winding direction that is opposite to that of the primary winding and wherein the auxiliary winding has a winding direction that is same as that of the primary winding.

14. The circuit of claim 13, wherein the controller circuit is coupled to the gate terminal and the drain terminal.

15. The circuit of claim 14, wherein the controller circuit is arranged to control a voltage at the gate terminal such that when the first switch is on, the second switch is off and when the first switch is off, the second switch is on.

16. The circuit of claim 13, further comprising a load coupled between the first output terminal and the second output terminal.

17. The circuit of claim 13, wherein the first switch is a gallium nitride (GaN) based transistor.

\* \* \* \* \*